106-90.
2-26-74  AU 116  EX
XR  3,793,975

United States Patent [19]
Duff

[11] 3,793,975
[45] Feb. 26, 1974

[54] REINFORCED CONCRETE BOAT HULL

[76] Inventor: Raymond A. Duff, 1333 S. Baker, Santa Ana, Calif. 92707

[22] Filed: Mar. 11, 1971

[21] Appl. No.: 123,269

Related U.S. Application Data

[63] Continuation-in-part of Ser. No. 851,961, Aug. 21, 1969, Pat. No. 3,664,287.

[52] U.S. Cl. .............................. 114/65 A, 106/90
[51] Int. Cl. ......................... B63b 3/00, B63b 5/14
[58] Field of Search ........ 114/65 A; 106/90; 52/309

[56] References Cited
UNITED STATES PATENTS

| 2,860,060 | 11/1958 | Benedict et al. | 106/90 |
| 3,240,736 | 3/1966 | Beckwith | 106/90 |
| 3,398,005 | 8/1968 | Felicetta et al. | 106/90 |
| 3,664,287 | 5/1972 | Duff | 114/65 A |
| 2,850,890 | 9/1958 | Rubenstein | 52/229 |

*Primary Examiner*—Duane A. Reger
*Assistant Examiner*—D. C. Butler
*Attorney, Agent, or Firm*—Dean Sandford

[57] ABSTRACT

A boat having a hull formed of a plurality of alternate, integrally bonded layers of a novel cementatious material and fiber-reinforced epoxy resin, and a method of constructing a concrete and fiber-reinforced epoxy resin boat hull are disclosed. The hull is a unitary structure comprised of a plurality of layers of the cementatious material having an integrally bonded layer of fiber-reinforced epoxy resin interspaced between adjacent layers of the cementatious material. The cementatious material is an admixture of hydraulic cement, aggregate, epoxy resin, water reducing additive, and sufficient water to harden the cement. Also, the hull can have an exterior resinous surface coating integrally bonded to it to enhance its appearance and serviceability.

17 Claims, 8 Drawing Figures

PATENTED FEB 26 1974　　　　　　　　　　3,793,975

INVENTOR.
RAYMOND A. DUFF
BY
Dean Sandford
ATTORNEY

PATENTED FEB 26 1974 3,793,975
SHEET 2 OF 2
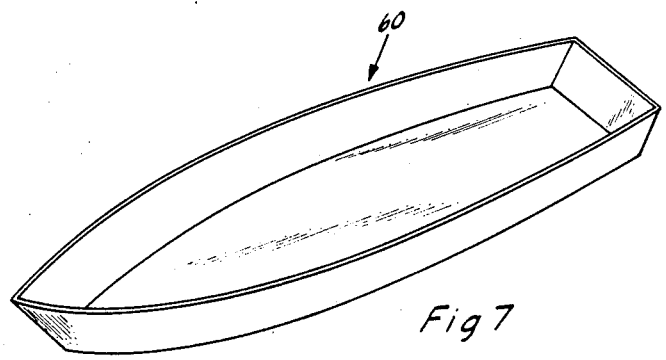
Fig 7
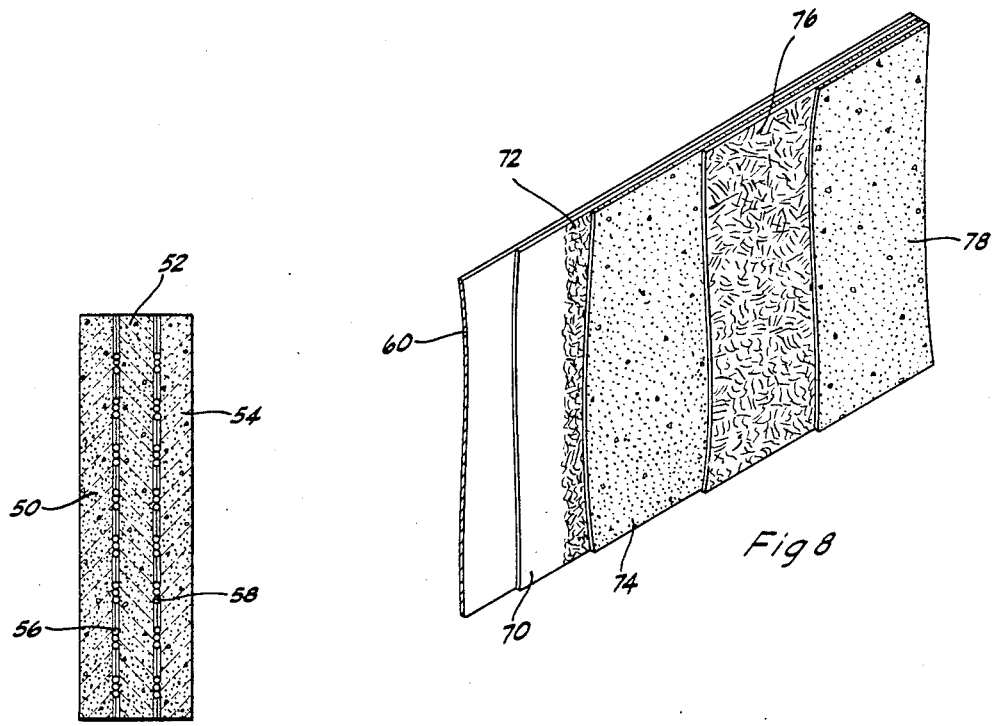
Fig 6
Fig 8
INVENTOR.
RAYMOND A. DUFF
BY
Dean Sanford
ATTORNEY

REINFORCED CONCRETE BOAT HULL

This is a continuation-in-part of application Ser. No. 851,961 filed August 21, 1969, and now issued as U.S. Pat. No. 3,664,287.

This invention relates to the construction of boats, and particularly to the construction of boats having reinforced concrete hulls.

Because of its relatively low cost, durability and availability, it has long been proposed that reinforced concrete be employed as a material of construction for boat hulls. However, because of the difficulty of attaining sufficient tensile and flexural strength, the difficulty of forming specially shaped parts, the high weight and large bulk of the formed structures, and the susceptibility of many concretes to attack by sea water, concrete has not gained wide acceptance as a material of construction for boat hulls, and particularly has not gained acceptance in the construction of small boats and pleasure craft. Fiber reinforced polyester resin has gained wide acceptance in boat construction because of its ease of forming, light weight, and attractive appearance. However, fiber reinforced polyester resin has the disadvantages of relative high cost, flamability and relatively low tensile and shear strengths. Hence, need exists for a relatively light weight, strong, low cost material for constructing boat hulls that is easy to form and affords an attractive and serviceable exterior surface.

Accordingly, a principal object of this invention is to provide a boat having a hull of relatively light weight, inexpensive construction.

Another object of this invention is to provide a boat having a reinforced concrete hull of superior strength and durability.

Still another object of this invention is to provide a boat having a relatively thin reinforced concrete hull of high strength and durability.

Yet another object of the invention is to provide a boat having a relatively thin reinforced concrete hull of high strength and durability that has an attractive and serviceable exterior surface.

A further object of this invention is to provide a boat having a reinforced concrete hull of unitary construction.

The manner in which the foregoing and other objects of this invention are realized will be apparent to those skilled in the art from the following description considered together with the accompanying drawings, wherein like numerals refer to like parts throughout; and in which:

FIG. 6 is a partial cross-sectional view of another embodiment of reinforced concrete construction employing a plurality of layers of concrete and fiber-reinforced epoxy resin;

FIG. 7 is a perspective view of the mold employed in the construction of the reinforced hulls of this invention; and FIG. 8 is a perspective view illustrating the method of constructing the reinforced concrete hulls of this invention.

Briefly, this invention contemplates a boat having a concrete hull formed of a plurality of alternate, integrally bonded layers of a cementatious material and fiber-reinforced epoxy resin, and a method of constructing a concrete and fiber-reinforced epoxy resin boat hull. The hull is a unitary structure comprised of a plurality of layers of the cementatious material having an integrally bonded layer of fiber-reinforced epoxy resin between adjacent layers of the cementatious material. The cementatious material is an admixture of hydraulic cement, aggregate, epoxy resin, water reducing additive, and sufficient water to harden the cement. Also, the hull can have an exterior resinous surface coating integrally bonded to it to enhance its appearance and serviceability.

Figure 1:
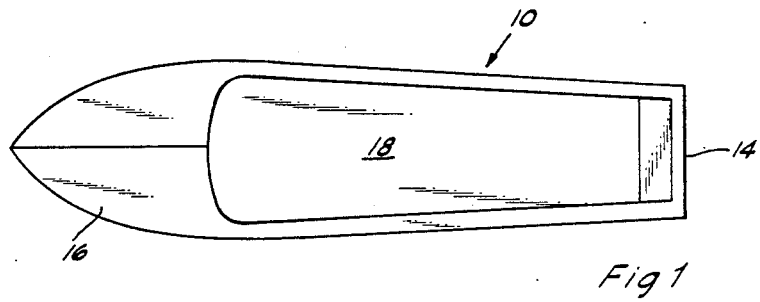
FIG. 1 is a top view of a boat constructed with the reinforced concrete hull of this invention.
Figure 2:
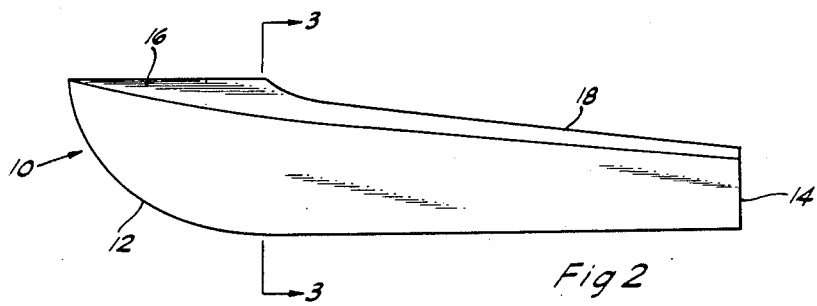
FIG. 2 is a side view of the boat illustrated in FIG. 1.

Referring now more specifically to the drawings, the numeral 10 generally designates a boat which can be seen in its completed form illustrated in FIGS. 1 and 2; and which includes a hull 12 having a rear transom section 14 and a deck 16 partially enclosing the hull 12 to provide a covered forward section and an open cockpit 18. For purposes of illustration, the drawings depict a boat of the runabout class adapted to be powered by an outboard motor, not shown, mounted on rear transom 14. However, it is to be realized that boats of all classes, such as rowboats, skiffs, whaleboats, lifeboats, launches speedboats, sailboats, houseboats and larger powered launches can be constructed in accordance with this invention, and that the power driven boats can be adapted to be powered by outboard motors, inboard-outboard motors, and by inboard motors.

Figure 3:
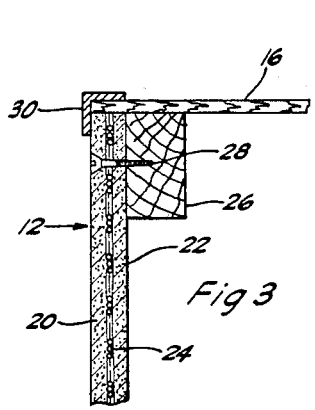
FIG. 3 is an enlarged partial cross-sectional view of the hull and deck construction of the boat illustrated in FIG. 1.

As particularly indicated in FIG. 3, hull 12 is a laminated structure comprised of two outer layers of cementatious material 20 and 22 and an intermediate layer 24 of fiber-reinforced epoxy resin bonding the outer layers into an integral unitary structure having high strength and durability. The finished hull can vary from about ⅛ inch to about 1 inch in thickness; however, an overall thickness of about one-fourth inch to about one-half inch is preferred in most applications.

FIG. 3 also illustrates the construction wherein a wood stringer 26 is attached along the upper inner edge of hull 12. Stringer 26 can be attached by any convenient means, such as by drilling and countersinking a hole through the hull and attaching the stringer with flathead screws 28. The screw holes can then be filled with cement or epoxy resin-cement mixture to cover the screw heads so as to provide a smoothly finished surface. Deck 16 can be constructed of wood, plastic, fiber glass, or laminated concrete and fiber-reinforced epoxy resin similar to hull 12, and is secured to stringer 26, and the joint finished with metal or plastic molding 30.

Figure 4:
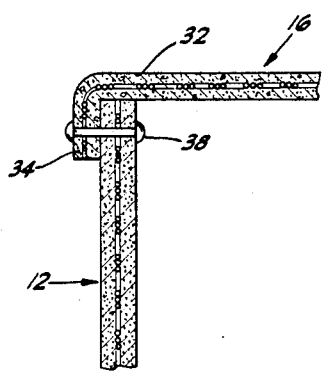
FIG. 4 is an enlarged partial cross-sectional view of another embodiment of hull and deck construction.

FIG. 4 illustrates an alternative mode of construction in which both hull 12 and deck 16 are constructed of laminated concrete and fiber-reinforced epoxy resin. In this embodiment, deck 16 is formed of a generally flat section 32 and an integral downturned lip 34 adapted to fit snugly on the exterior of hull 12. Deck 16 can be attached to hull 12 by any convenient means, such as by drilling a hole through both lip 34 and hull 12, and joining these sections by bolts, or, as illustrated, by rivets 38. Also, the joint can be sealed and further joined by coating the mating surfaces of the hull and deck with epoxy resin prior to adjoining them so as to form a tight bond therebetween.

Figure 5:
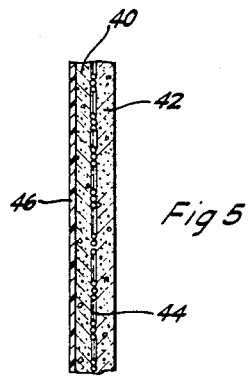
FIG. 5 is a partial cross-sectional view of one embodiment of hull and deck construction having a resinous exterior surface.

FIG. 5 illustrates an embodiment wherein the laminated structure is comprised of two layers of cementatious material 40 and 42 and an intermediate layer 44 of fiber-reinforced epoxy resin bonding the cementatious material into an integral unitary structure having high strength and durability. An outer resinous surface coating 46 can optionally be integrally bonded to the cementatious material.

FIG. 6 illustrates a mode of construction wherein the hull, deck, transom, bulkhead, or other relatively thick section is constructed of a plurality of layers of cementatious material with intermediate layers of fiber-reinforced epoxy resin integrally bonded therebetween to provide a unitary structure. In the illustrated embodiment, the integral structure is formed of three layers of cementatious material 50, 52 and 54, with a layer of fiber-reinforced epoxy resin 56 and 58 interposed between adjacent layers of the cementatious material. With this mode of construction, a member can be formed with as many alternate layers of the cementatious material and fiber-reinforced epoxy resin as desired.

The concrete employed in the constructions of this invention is a hardened mixture of hydraulic cement, epoxy resin, water reducing agent, and sufficient water to harden the cement. The hydraulic cement can be any of the commercial hydraulic cements such as ASTM Type I or normal Portland cement, ASTM Type II or modified Portland cement, ASTM Type III or high-early-strength Portland cement, ASTM Type IV or low-heat Portland cement, ASTM Type V or sulphate resistant Portland cement, ASTM Type IP or Portland-pozzolana cement, plastic cement, or gun plastic cement. Also, the cement can optionally contain additives to improve various properties, such as workability, aggregate segregation, air entrainment, and to accelerate or slow setting time. The aggregate is sand, although fine pea gravel and crushed aggregate can be used in part, particularly in thicker constructions, and lightweight or low density aggregate can be employed where it is desired to minimize weight.

Various commercial epoxy resin compositions can be employed in the practice of this invention. These are typically undiluted low viscosity liquids or more viscous resins diluted with a solvent, and are conventionally employed in a two component system, i.e., the resin and the catalyst are separately packaged and admixed only at the time of use. The epoxy resins preferred in the practice of this invention are undiluted liquids that exhibit the following properties after curing for 7 days:
Tensile strength—8,000 psi minimum
Tensile elongation—10 percent maximum
Flexural strength—15,000 psi minimum
Compressive yield—12,000 psi minimum
Hardness—above 60 shore D A commercial epoxy resin exhibiting the foregoing properties and which is particularly useful in the practice of this invention is a relatively low viscosity, two component epoxy resin marketed by the Adhesive Engineering Company under the trademark Concresive No. 1170, and identified as Part A and Part B. This material is admixed in the ratio of about 2 parts of Part A to 3 parts of Part B to about 3 parts of Part A to 2 parts of Part B, and is preferably employed in the proportion of about equal parts of Part A and Part B. Preferably, the two epoxy resin components are intimately admixed prior to adding them to the wet cement mixture.

A suitable epoxy resin is the diglycidyl ether of bisphenol A which can be formed by the condensation of epichlorohydrin and bisphenol A, i.e., bis(4-hydroxyphenyl) dimethyl methane. A preferred bisphenol A diglycidyl ether is a liquid thermosetting resin having a Brookfield viscosity of about 10,000 to 16,000 centipoise at a temperature of 25° C. and an epoxide equivalent weight of about 185 to 200. A suitable bisphenol A diglycidyl ether of this type is marketed by Celanese Coating Company under the trademark Epi-Rez 510.

The bisphenol A diglycidyl ether can be admixed with a reactive diluent to provide a modified resin system. A preferred epoxy resin is an admixture of bisphenol A diglycidyl ether and ortho-cresyl glycidyl ether containing about 20 to 40 percent of the reactive diluent. A particularly preferred resin combination is an admixture of about 73 parts of Bisphenol A diglycidyl ether and 27 parts of ortho-cresyl glycidyl ether. A suitable orthocresyl glycidyl ether reactive diluent having a Brookfield viscosity of 5 to 25 centipoises at 25° C. and an epoxide equivalent weight of 180 to 200 is marketed by the Celanese Coatings Company under the trademark Epi-Rez 5011. A commercially available admixture of 73 percent diglycidyl ether of bisphenol A and 17 percent ortho-cresyl glycidyl ether suitable for use in the compositions of this invention is marketed by the Celanese Coatings Company under the trademark Epi-Rez 5077. This resin mixture has a Brookfield viscosity of 500 to 700 centipoises at 25° C. and an epoxide equivalent weight of 185 to 200.

A wide variety of catalysts and reactive hardeners are known that cure or harden epoxy resins. While a number of different agents can be employed to cure the epoxy resins employed in the compositions of this invention, the reactive amine-type hardeners are preferred. A particularly preferred hardener is an admixture of a reactive amido-amine such as dicyandiamide and a highly reactive modified amine converter. A suitable hardening agent of this type is marketed by the Celanese Coatings Company under the trademark Epi-Cure 872. The preferred hardening agent is added to the epoxy resin in the proportions of about 0.3 to 1 part of hardening agent per part of resin, and preferably in the proportion of about 0.5 part of hardener per part of resin.

The water reducing additive employed in the composition of this invention is a liquid admixture consisting principally of hydroxylated polymers, calcium lignosulfonate, and an organic accelerator. A suitable water reducing agent is marketed by Master Builders under the trademark Pozzolith 300–N. The liquid water reducing additive is employed in small amounts, such as in the proportion of about 1 to 6 fluid ounces per 94 pound sack of cement, and preferably in the proportion of about 2 to 4 fluid ounces per sack of cement.

The cementatious compositions of this invention are prepared by admixing the ingredients in the proportion of about ¼ to 3, and preferably about ¼ to 1½ gallons of combined epoxy resin and hardener, about 1 to 3 cubic feet of aggregate, about 1 to 6 fluid ounces of liquid water reducing additive, and about 4 to 6, and preferably about 4½ to 5 gallons of water per 94 pound sack of cement. A preferred composition comprises an admixture of about three-fourths gallon of epoxy resin and hardener, about 2 cubic feet of aggregate, about 3 fluid ounces of liquid water reducing additive, and about 4 to 6 gallons of water per 94 pound sack of cement, the exact amount of water depending upon the moisture content of the sand. The aggregate content of this composition on a weight basis is about 100 to 300 pounds, and preferably about 200 pounds per 94 pound sack of cement when using regular sand, and about 55 to 165 pounds per sack when using light weight aggregates. The amount of water employed in the cementatious compositions of this invention has been found to be substantially less than would be required to hydrate and cure conventional concrete.

Also, it has been found that the cementatious compositions of this invention cure or harden substantially faster than conventional concrete, curing often being sufficiently complete in only a few hours at ambient temperature to permit an article to be removed from a mold or subjected to a moderate amount of handling, although several days will be required for the material to reach substantially full strength.

The compositions of this invention are preferably prepared by admixing the water and the water reducing additive, then adding the cement and mixing the mass to a uniform consistency. Next, the aggregate is added and thoroughly mixed. The epoxy resin and the hardener is premixed and, as a final step, thoroughly mixed into the cementatious composition. It should be noted that no more water can be added to cementatious mixture after the resin has been added. Any adjustment of moisture content must be done before addition of the resin. Also, in an alternative mode of preparation, the water reducing additive can be premixed with the epoxy resin and hardener, and this admixture added to the wet cement.

The fiber-reinforcing material for the epoxy resin layer can be metal, plastic, cloth, or fiber glass in the form of matting, woven material, or short lengths of chopped fibers. Other fibers that can be employed in addition to fiber glass are sisal, hemp, cotton, nylon, rayon, polyethylene terephthalate (Dacron), acrylic fibers (Orlon), and other synthetic and natural fibers. Included within the woven materials are metal, plastic, cloth or glass screen or mesh. A particularly preferred fiber-reinforcing material that imparts superior strength to the ultimate structure is woven fiber glass roving. Fiber glass roving is a woven-type material in which bundles of glass fibers are woven in a basket-like weave.

The hulls, decks and other concrete parts of the boats of this invention are constructed by applying the materials wet, or in the uncured form, to suitably shaped molds. The cementatious material and epoxy resin are then hardened by curing, and the hardened member removed from the mold and assembled into the completed boat.

FIG. 7 illustrates a typical concave mold 60 that can be employed in the construction of the reinforced concrete hulls of this invention. Optionally, the mold is coated with a suitable concrete form release, mold release or separating compound to facilitate removal of the completed structure from the mold. As illustrated in FIG. 8, a first relatively thin layer 70 of polyester or epoxy gel coat is applied to the mold by spray or hand application. This layer of gel coat ultimately forms the exterior surface coating of the hull. The gel coat reproduces the mold surface exactly to form a mirror image of the mold on the surface of the construction. While the mold surface can be varied to provide any desired effect, it is usually preferred that the mold have a smooth mirror-like surface to provide a highly polished, porcelain-like finish, particularly on the hull surface.

When the gel coat has cured or hardened to at least a tackey consistency, layer 72 of reinforcing fibers, such as glass fibers, and epoxy resin is applied directly over the gel coat. The epoxy resin can be the same resin-hardener added to the cementatious composition. Fiber-reinforced epoxy resin layer 72 can be formed by presaturating the fibers with epoxy resin and applying the epoxy resin saturated fibers to the previously applied gel coat. Alternatively, the fiber reinforcing material can be applied to the previously applied gel coat, and the epoxy resin then applied by brushing, rolling or spraying. Where chopped fibers are employed, it is convenient to apply the fibers with a chopper gun that simultaneously blows the chopped fibers and sprays the epoxy resin and hardener onto the surface to be coated.

A relatively thin layer 74 of the cementatious material of this invention is applied over fiber-reinforced epoxy resin layer 72. The uncured cementatious material can be readily applied by trowelling, or with a low pressure plaster gun. Next, the layer 76 of epoxy resin saturated fibers is applied, and thereafter, the layer 78 of uncured cementatious material is applied. If desired, additional layers of epoxy saturated fibers and cured cementatious material can be applied to obtain a structure having the desired number of laminations. The final layer of uncured cementatious material can be finished in any conventional manner to provide the desired finish, such as by trowelling, floating, rubber floating, brooming, and the like, or it can be left unfinished. It is sometimes desirable to apply a light coat of epoxy resin over this final layer to act as a sealer and to inhibit crazing of the cementatious material.

After the wet cementatious mixture and epoxy resin has set sufficiently that the structure has sufficient strength to be handled, the structure can be removed from the mold. Larger structures, such as the molded hull sections, can be effectively removed from the mold by injecting water or air, under pressure, between the concrete structure and the mold. The water or air breaks the concrete away from the mold and floats the structure in the mold. Water or air can be conveniently injected between the structure and the mold by connecting a water or air hose to a suitable hose connection in the bottom of the mold.

The preformed hull and deck sections are assembled into the completed boat. Where a gel coat surface is not employed, the exterior surfaces of the concrete hull and deck sections can be left unfinished, or they can be provided with one or more coats of a suitable paint. A particularly durable finish is provided by coating the exterior surfaces of the concrete with epoxy paint. The boat can be fitted with marine hardware and accessory equipment in conventional manner.

While various embodiments of the invention have been described, it will be obvious to those skilled in the art that it is not so limited, but is susceptible of various changes and modifications, which are considered within the spirit and scope of the invention as defined by the attached claims.

Having now described my invention, I claim:

1. A boat hull comprising a unitary, generally hollow-form, relatively thin-walled, buoyant structure comprised of integrally bonded alternate layers of (1) a cementatious material comprised of an admixture of hydraulic cement, aggregate, epoxy resin, water reducing additive, and sufficient water to harden the cement, and (2) fiber-reinforced epoxy resin.

2. The article defined in claim 1 wherein said cementatious material is an admixture of 1 to 3 cubic feet of aggregate, ¼ to 3 gallons of epoxy resin, 1 to 6 fluid ounces of liquid water reducing additive, and 4 to 6 gallons of water per 94 pound sack of hydraulic cement.

3. The article defined in claim 1 wherein said fiber-reinforced epoxy resin is epoxy resin reinforced with metal, plastic, cloth or glass mesh or screen; cloth, plastic or fiber glass matting; chopped cloth, plastic or fiber glass; or woven plastic or fiber glass roving.

4. The article defined in claim 1 wherein said structure is comprised of a plurality of layers of said cementatious material with an integrally bonded layer of fiber-reinforced epoxy resin interspaced between adjacent layers of said cementatious material.

5. The article defined in claim 1 wherein said structure is comprised of two layers of said cementatious material and a layer of fiber-reinforced epoxy resin therebetween.

6. The article defined in claim 1 wherein said epoxy resin is an admixture of diglycidyl ether of bisphenol A and a reactive hardener.

7. The article defined in claim 1 wherein said epoxy resin is an admixture of diglycidyl ether of bisphenol A, ortho-cresyl glycidyl ether and a reactive hardener.

8. The article defined in claim 1 wherein the exterior surface of said hull is coated with epoxy paint.

9. The article defined in claim 1 including a resinous surface coating bonded on the exterior of said structure.

10. A boat hull comprising a unitary, generally hollow-form, relatively thin-walled, buoyant structure comprised of a plurality of alternate layers of (1) a hardened cementatious material comprised of 1 to 3 cubic feet of aggregate, ¼ to 3 gallons of epoxy resin, and 1 to 6 fluid ounces of water reducing additive per 94 pound sack of hydraulic cement, and (2) fiber-reinforced epoxy resin.

11. The article defined in claim 10 wherein said epoxy resin is an admixture of a diglycidyl ether of bisphenol A and a reactive hardener.

12. The article defined in claim 10 wherein said epoxy resin is an admixture of diglycidyl ether of bisphenol A, orthocresyl glycidyl ether and a reactive hardener.

13. The article defined in claim 10 wherein said water reducing agent is an admixture of hydroxylated polymer, calcium lignosulfonate and an organic accelerator.

14. The article defined in claim 10 including an integrally bonded exterior coating of polyester or epoxy gel coat.

15. A boat hull comprising a unitary, generally hollow-form, relatively thin-walled, buoyant structure comprised of a laminate consisting of an exterior layer of polyester or epoxy resin gel coat and alternate integrally bonded layers of fiber glass reinforced epoxy resin and a cementatious material consisting of an admixture of 1 to 3 cubic feet of aggregate; ¼ to 3 gallons of epoxy resin comprising an admixture of diglycidyl ether of bisphenol A, ortho-cresyl glycidyl ether and reactive hardening agent; 1 to 6 fluid ounces of a water reducing additive comprised of an admixture of hydroxylated polymer, calcium lignosulfonate and an organic accelerator, and sufficient water to harden the cement per 94 pound sack of hydraulic cement.

16. The article defined in claim 15 wherein said cementatious material is an admixture of about 2 cubic feet of aggregate, ¼ to 1 gallon of said epoxy resin; 2 to 4 fluid ounces of said water reducing agent, and about 4 to 6 gallons of water per 94 pound sack of cement.

17. The article defined in claim 15 including a deck at least partially covering said hull, said deck comprising a laminate consisting of an exterior layer of polyester or epoxy resin gel coat and alternate integrally bonded layers of fiber glass reinforced epoxy resin and said cementatious material.

* * * * *